United States Patent [19]

Neuzil

[11] Patent Number: 4,993,484
[45] Date of Patent: Feb. 19, 1991

[54] AIR TO AIR HEAT EXCHANGER

[75] Inventor: Jack E. Neuzil, Johnson County, Iowa

[73] Assignee: Kirkwood Community College Facilities Foundation, Cedar Rapids, Iowa

[21] Appl. No.: 297,109

[22] Filed: Jan. 17, 1989

[51] Int. Cl.⁵ .......................... F24H 3/02; F24F 7/10
[52] U.S. Cl. .................................. 165/54; 165/909; 98/33.1; 98/40.19
[58] Field of Search .................. 165/54, 909; 98/33.1, 98/40.19

[56] References Cited

U.S. PATENT DOCUMENTS

| | | | |
|---|---|---|---|
| 2,488,333 | 11/1949 | Schlachter | 98/33.1 |
| 3,949,522 | 4/1976 | Kehl et al. | 98/40.19 |
| 4,312,320 | 1/1982 | Jennings | 165/909 |
| 4,590,990 | 5/1986 | George | 165/54 |
| 4,616,696 | 10/1986 | Brundrett et al. | 165/54 |
| 4,794,980 | 1/1989 | Raisanen | 165/54 |
| 4,872,503 | 10/1989 | Marriner | 165/54 |

FOREIGN PATENT DOCUMENTS

| | | | |
|---|---|---|---|
| 1192901 | 9/1985 | Canada | 165/54 |
| 0082042 | 7/1978 | Japan | 165/54 |
| 0160799 | 9/1983 | Japan | 165/54 |

Primary Examiner—John Ford
Attorney, Agent, or Firm—James C. Nemmers

[57] ABSTRACT

An air to air heat exchange system for removing undesirable air from an enclosed structure. The heat exchanger provides for the removable of air containing pollutants, toxics gases and odors while providing for the recovery of heat from the exhaust air. The system utilizes a plurality of tubes within a larger tube so that air can flow freely over and around the smaller tubes thus providing for maximum heat transfer between the incoming air in the smaller tubes and the exhaust air in the larger tube. The smaller tubes, if used for the incoming air, permit the air to be distributed to various selected locations throughout the structure.

1 Claim, 2 Drawing Sheets

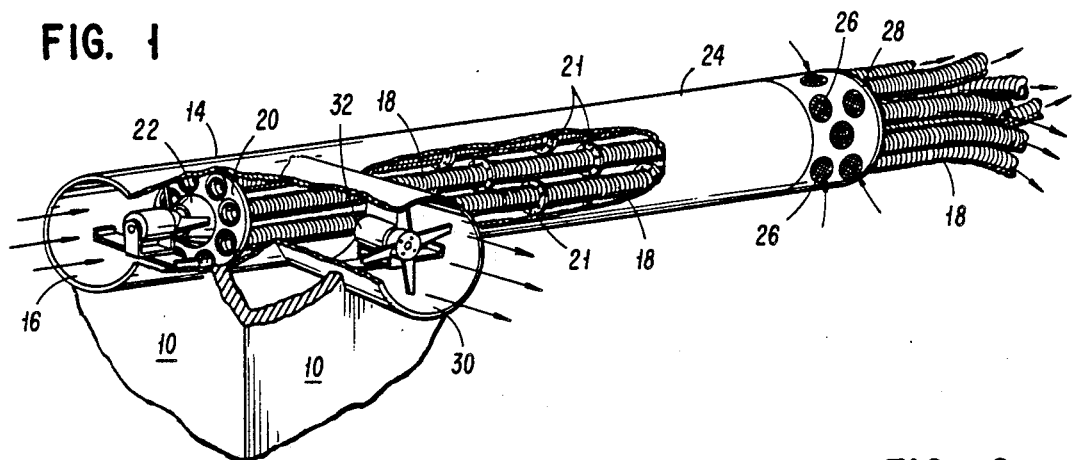
FIG. 1
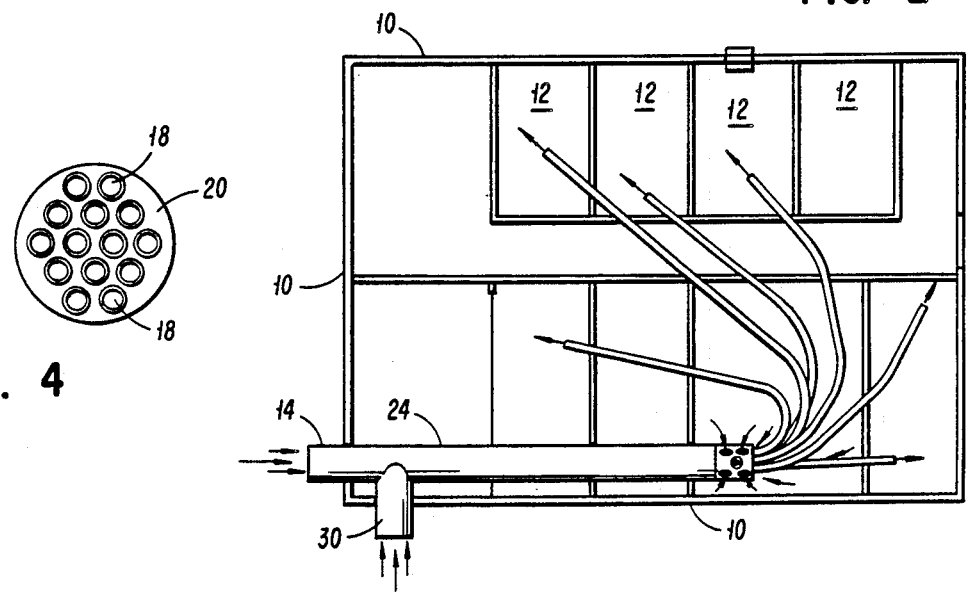
FIG. 2
FIG. 4
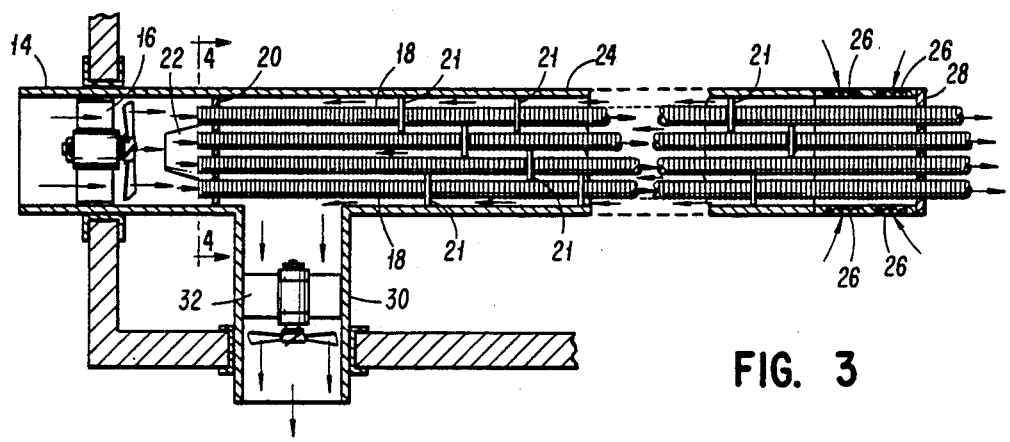
FIG. 3

| OUTSIDE AIR TEMP °F | INTAKE AIR TEMP °F | DELTA "T" °F | INSIDE AIR TEMP °F | SAVING BTU/HR |
|---|---|---|---|---|
| −10 | 44 | 54 | 64 | 40,800 |
| −6 | 44 | 50 | 60 | 37,800 |
| −1 | 46 | 47 | 61 | 35,500 |
| 10 | 50 | 40 | 60 | 30,200 |
| 15 | 55 | 40 | 60 | 30,200 |
| 20 | 55 | 35 | 70 | 26,400 |
| 25 | 59 | 34 | 72 | 25,700 |
| 30 | 56 | 26 | 68 | 19,600 |
| 35 | 61 | 26 | 74 | 18,900 |
| 41 | 62 | 21 | 73 | 15,800 |
| 45 | 61 | 16 | 70 | 12,000 |
| 50 | 65 | 15 | 74 | 11,300 |

FIG. 5

AIR TO AIR HEAT EXCHANGER

BACKGROUND OF THE INVENTION

There are of course numerous types of heat exchangers that are used for a variety of purposes; e.g., to produce a cooling or heating effect or to improve efficiencies in heating or cooling systems by making the maximum utilization of available energy. Some heat exchangers, such as liquid heat exchangers, are relatively efficient. On the other hand, air-to-air type heat exchangers have been generally inefficient, and the energy savings usually did not justify the cost of the heat exchanger.

Air exhaust systems are becoming increasingly used to exhaust from an enclosure air that is undesirable because of temperature, humidity or pollutants. For example, the air in livestock confinement buildings must be exhausted because of the toxic gases that are created in such buildings. Unless exhausted, the air becomes warm and stagnant and the odor becomes almost over powering. The long-term health effects are not known, but it is believed that unless the air from such confinement buildings is frequently exhausted, farmers may suffer ill-effects, and the effect on the confined livestock is also not desirable.

More recently, concern has been publicized regarding radon gas in residential structures. One method of reducing the level of the harmful radon gas in living structures is to exhaust the air from the portion of the structure below ground level, this being the area of the structure where the radon gas invades the structure.

Regardless of the reason for exhausting air from an enclosed structure, the loss of energy can be fairly substantial especially during times of temperature extremes. Moreover, it is not only beneficial to exhaust undesirable air from an enclosed structure, but the air should be replaced with fresh air from outside the structure. Obviously, during times when the temperature of the outside air is much higher or lower then the temperature of the air within the structure, energy inefficiencies result.

Although air-to-air heat exchangers are known, they have had a number of problems and are relatively expensive for the energy savings produced. For example, fin-type exchangers are commonly used because of their higher efficiency. But if the air flowing through the exchanger contains a considerable amount of dust or other pollutants, the heat exchanger of the fin type can become rapidly clogged, thereby reducing its efficiency. Also, efficient distribution of the incoming outside air within the enclosed structure has not been satisfactory with prior art systems.

There is therefore a need for an efficient air-to-air heat exchanger that can be manufactured and installed at a relatively low cost and one which can be operated easily and with little or no maintenance.

SUMMARY OF THE INVENTION

The heat exchanger of the invention is a nested tube air-to-air heat exchanger in which one or more inlet air tubes are spaced apart inside of a larger tube that carries the exhaust air. The spacing of the smaller inlet air tubes allows the exhausted air to circulate around the tubes, but the spacing between the tubes is sufficiently large that clogging from contaminants in the exhaust air is not a problem. The inner tube or tubes are preferably corrugated. Maximum heat transfer occurs between the inlet air and the exhaust air because of the increased surface area provided by the irregular surface of smaller inlet air tubes. The irregular surface also creates turbulence in the air flow which increases the residence time of the exhaust air to improve the heat transfer rate. A plurality of inlet air tubes also permits the extension of individual tubes to selected locations inside the structure so as to providing more even distribution of the inlet air.

BRIEF DESCRIPTION OF THE DRAWINGS

FIG. 1 is a perspective view, partly in section, and showing a typical heat exchanger installation according to the principles of the invention;

FIG. 2 is a plan view of a typical installation for an enclosure and illustrating positioning of the inlet air tubes at different locations within the structure;

FIG. 3 is a sectional plan view of the arrangement of FIG. 1; and

FIG. 4 is a sectional view taken on the line 4—4 of FIG. 3 and showing the end cap at the inlet end of the inlet air tubes.

FIG. 5 is a chart showing the results of an actual installation of the system of the invention in a livestock confinement building.

DESCRIPTION OF THE PREFERRED EMBODIMENT OF THE INVENTION

Referring now to the drawings, there is illustrated an enclosure which has exterior walls 10 separating the enclosure from the outside ambient air. For purposes of illustration, FIG. 2 shows a plan view of a livestock confinement building which has a plurality of stalls or compartment 12 which house one or more animals.

A fresh air intake pipe 14 extends through one of the walls 10 to the exterior of the structure. Mounted inside of the intake pipe 10 is an air moving means such as fan 16 which will draw the outside air into the intake pipe 14 and discharge it into the intake ends of one or more inner air tubes 18. Tubes 18 are positioned inside of the larger outer tube 24 by a header or end cap 20 (FIG. 4) which holds the tubes 18 in a spaced apart position. Additional spacers 21 may be positioned as necessary at intervals along each of the tubes 18. Header 20 also assures that the intake and exhaust airs do not become mixed. A diverter cap 22 directs the intake air into the outer most ones of the tubes 18 while permitting the air to also flow into the inner most ones of the tubes 18 as well. In some applications where the volume of air to be moved is relatively small, it may be necessary to have only a single inner tube 18. In any event the number and size of the inner tubes 18 and the size of the outer tube 24 should be selected so that the volume of air capable of being moved within the inner tubes 18 is approximately equal to the volume of air flowing inside of the space inside of the large tube 24 and outside of the inner tubes 18. This makes it possible to replace all the exhaust air with outside air. Variations in the volumes of the intake and exhaust air can be compensated for by varying the speed of fans 16 and 32.

The inner tubes 18 are preferably formed of a corrugated material. This increases the surface area of each tube 18 to almost twice that of a smooth-surface tube. This increases the heat transfer between the air flowing inside the tube 18 and the air flowing around its exterior surface because of not only the greater surface area, but also the turbulence created by the irregular surface improves the heat transfer rate.

The intake tubes 18 are thus nested inside of the larger tube 24 which is an extension of the intake pipe 14 and which confines the exhaust air admitted through the exhaust intake openings 26, which are located in tube 24 a considerable distance from the intake pipe 14. The length of the larger outer tube 24 depends upon the available space, and the exhaust intake openings 26 are located at the distal end of the tube 24. Obviously, the longer the tube 24, the more heat transfer will take place between the exhaust air and the incoming outside air.

The inner tubes 18 extend through the end cap 28 at the distal end of the larger tube 24, and the individual inner tubes 18 can then be positioned so as to direct the outside air to selected locations throughout the interior of the enclosure provided by walls 10. See FIG. 2. Extending the tubes 18 also provides for additional heat exchange between the intake air and the air in the structure. The specific location of the discharge ends of the intake tubes 18 and where they discharge the outside air depends upon the particular application for the heat exchanger of the invention. However, the specific design of the invention provides the flexibility to distribute the intake air to a variety of locations within the structure for the most efficient distribution. In livestock confinement buildings that have partitions that form a plurality of stalls 12, it is important that the fresh outside air be distributed in a number of locations so as to reach each stall.

The exhaust air from the interior of the enclosure is pulled through the exhaust intake openings 26 into the area inside of the larger tube 24 and is discharged through the exhaust pipe 30 which extends through another of the walls 10 of the structure. Preferably, the exhaust pipe 30 extends through a wall 10 different from the wall 10 through which the intake pipe 14 extends. In any event, the intake pipe 14 and exhaust pipe 30 should be separated a sufficient distance so that the air exhausted through exhaust pipe 30 is not pulled back into the structure through the intake pipe 14. With the arrangement shown in the drawings, the exhaust air is discharged at an angle approximately 90° from the intake pipe 14 to better assure that the intake air is not contaminated with the exhaust air. The air is exhausted from the structure by means of an exhaust fan 32 located in the exhaust pipe 30.

Obviously, the fans 16 and 32 are shown as being positioned to pull in the outside air and pull out the air inside of the structure. The same effect could be accomplished by positioning the fans so that they are at the opposite ends of the intake and exhaust pipes 14 and 30, respectively. In other words, whether the fans 16 and 32 pull or push the air is of no significance, and the fans should be located to minimize noise and also for convenience of service.

Obviously, from the arrangement just described, the air inside of the structure will be discharged and fresh air from the exterior of the structure added to replace the exhausted air. Depending upon the temperature differential between the outside and inside air, heat exchange will occur as the exhaust air passes over and around the inner tubes 18 carrying the outside air. The heat exchanger of the invention is used in most instances where warm air is exhausted and cooler outside air is brought in. In this application, the system recovers the heat of the exhaust air while allowing the undesirable air pollutants, dust, gases and odors to be removed from this structure. The chart of FIG. 5 shows the results of an actual installation of the system of the invention in a livestock confinement building during winter months in which the outside temperature ranges from −10° F. to 50° F., with air being moved through the heat exchanger at the rate of about 700 cubic feet per minute.

In the third column of the chart, Delta "T" is the temperature differential between the outside air and the air when discharged from the intake air tubes 18. Column four states the resulting temperature inside of the building. The BTU's/Hr. column sets forth the resulting amount of heat (in dry air) that is saved by the heat exchanger of the invention.

It will be seen that substantial savings in heat can be achieved using the air to air heat exchanger of the invention. Similar savings can be made when the heat exchanger of the invention is utilized to discharge air from a residential structure where it becomes necessary to exhaust air from the structure due to contamination by radon gas or other pollutants. The principles of the invention can also be utilized in a heat exchanger used for corn or other grain drying operations in which it becomes necessary to exhaust hot air from a grain storage bin and replace that air with outside air. The heat exchanger of the invention is obviously very simple and relatively inexpensive to construct. If proper materials are utilized, such as plastics or other corrosion resistant materials, the system will have a long useful life since the contaminated gases from the exhaust air will not attack these materials. Also, obviously, various automatic controls can be incorporated into the system to vary the speed of the fans, to shut the fans off and on according to a designated program, or to open and close dampers to direct the discharge air to various locations at different times. In any event, it is evident that the system will eliminate the polluted air while utilizing the heat of the polluted exhaust air, and the system requires little or no maintenance since dust and other airborne contaminates will not clog the heat exchange surfaces. Maximum heat exchange efficiency is achieved because the exhaust air is in maximum contact with the tubes carrying the intake air.

Although the invention has been described in connection with a preferred embodiment thereof, and is being described as being utilized primarily where the outside temperature is less than the temperature inside of the structure, it is obvious that the heat exchanger has application where the outside temperature is greater then the temperature inside of the structure. In this instance, the incoming outside air can be cooled by the cooler exhaust air, thus providing a cooling effect on extremely hot days. It will be further evident to those skilled in the art that various revisions and modifications can be made structurally to the specific embodiment and arrangement disclosed herein. It is my intention however that all such revisions and modifications that are evident to skilled in the art will be included within the scope of the following claims.

What is claimed is as follows:

1. An air-to-air heat exchanger for exhausting air from inside of an enclosure and replacing the exhausted air with air from outside the enclosure, said heat exchanger comprising an outer duct, a plurality of inner ducts positioned inside of the outer duct, the inner ducts each being smaller than the outer duct and spaced-apart from each other and from the outer duct, means to maintain the position of the inner ducts spaced relative to the outer duct along substantially the entire length of the outer duct, the cross-sectional area of the space between the outer duct and the inner ducts being approximately the same as the cross-sectional area of the inner duct so that approximately the same volume of air can flow through the inner ducts as the air flowing in the space between the inner ducts and outer duct, the inner ducts having an outer surface that is corrugated to increase substantially the surface area of the inner ducts, means for moving air from outside the enclosure area through only the inner ducts and discharging it inside of the enclosure, the discharge ends of the inner ducts extending beyond the outer duct and being adapted to be located at different selected positions inside of the enclosure, and means for moving air from inside the enclosure only through the space between the inner ducts and the outer duct and discharging the air outside of the enclosure.

* * * * *